(12) United States Patent
Miller et al.

(10) Patent No.: US 7,298,754 B1
(45) Date of Patent: Nov. 20, 2007

(54) CONFIGURABLE SWITCH FABRIC INTERFACE BANDWIDTH SYSTEM AND METHOD

(75) Inventors: Kirk Alvin Miller, San Diego, CA (US); Prayag Bhanubhai Patel, San Diego, CA (US); George Beshara Bendak, San Diego, CA (US); Kenneth Yi Yun, San Diego, CA (US); Sushil Kumar Singh, San Diego, CA (US); Ayoob Eusoof Dooply, San Diego, CA (US); Michael John Hellmer, Carlsbad, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1022 days.

(21) Appl. No.: 10/403,964

(22) Filed: Mar. 31, 2003

Related U.S. Application Data

(63) Continuation-in-part of application No. 10/023,266, filed on Dec. 14, 2001, now abandoned, and a continuation-in-part of application No. 10/022,673, filed on Dec. 17, 2001, now Pat. No. 7,079,545, and a continuation-in-part of application No. 10/029,581, filed on Dec. 20, 2001, and a continuation-in-part of application No. 10/035,835, filed on Dec. 24, 2001, now Pat. No. 7,020,131, and a continuation-in-part of application No. 10/373,139, filed on Feb. 24, 2003.

(51) Int. Cl.
*H04L 12/56* (2006.01)

(52) U.S. Cl. .................. 370/401; 370/419; 370/463
(58) Field of Classification Search .................. None
See application file for complete search history.

(56) References Cited

U.S. PATENT DOCUMENTS

| | | | | |
|---|---|---|---|---|
| 6,553,026 | B1* | 4/2003 | Aihara | 370/358 |
| 7,154,902 | B1* | 12/2006 | Sikdar | 370/412 |
| 7,158,536 | B2* | 1/2007 | Ching et al. | 370/468 |
| 2004/0047408 | A1* | 3/2004 | Koenenkamp et al. | 375/224 |
| 2004/0100946 | A1* | 5/2004 | Schriel et al. | 370/366 |

* cited by examiner

*Primary Examiner*—Brian Nguyen
(74) *Attorney, Agent, or Firm*—Law Office of Gerald Maliszewski; Gerald Maliszewski

(57) ABSTRACT

A system and method are provided for configuring interface bandwidths in a packet communications switch fabric. The method comprises: interfacing data links with a first plurality of traffic managers (TMs); differentiating port card interface ports into a first plurality of subchannels associated with the first plurality of TMs; and, communicating packets information with the TMs at a first plurality of data rates corresponding to the first plurality of subchannels. More specifically, differentiating port card interface ports into a first plurality of subchannels associated with the first plurality of TMs includes: differentiating a second plurality of ingress data links into a third plurality of ingress subchannels associated with a third plurality of ingress traffic managers (iTMs); and, differentiating a fourth plurality of egress data links into a fifth plurality of egress subchannels associated with a fifth plurality of egress TMs (eTMs).

24 Claims, 5 Drawing Sheets

Fig. 5 *(PRIOR ART)*
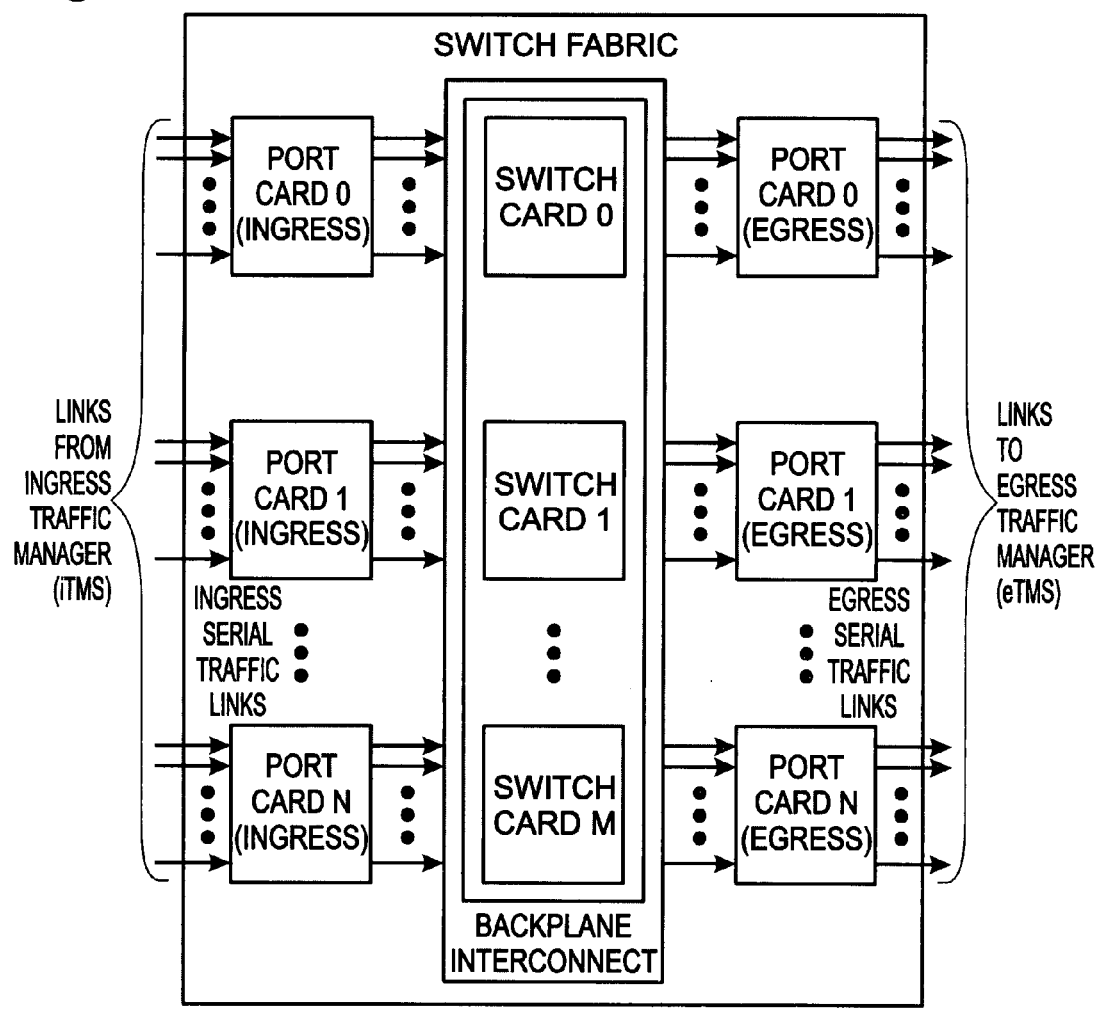

CONFIGURABLE SWITCH FABRIC INTERFACE BANDWIDTH SYSTEM AND METHOD

RELATED APPLICATIONS

This application is a continuation-in-part of a application entitled, SYSTEM AND METHOD FOR SWITCHING VARIABLY SIZED INFORMATION GROUPS, invented by Yun et al., Ser. No. 10/023,266, filed Dec. 14, 2001, now abandoned.

This application is a continuation-in-part of a application entitled, SYSTEM AND METHOD FOR SIMULTANEOUS DEFICIT ROUND ROBIN PRIORITIZATION, invented by Yun et al., Ser. No. 10/022,673, filed Dec. 17, 2001, now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a application entitled, SYSTEM AND METHOD FOR HIERARCHIAL SWITCHING, invented by Yun et al., Ser. No. 10/035,835, filed Dec. 24, 2001, now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003, which is incorporated herein by reference.

BACKGROUND OF THE INVENTION

1. Field of the Invention

This invention generally relates to packet communications switching and, more particularly, to a system and method for configuring the ingress and egress interface bandwidths of a switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 5 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 to 8 in the example above), the entire channel is out of service, degrading fault tolerance; and, the interface between the TM and switch fabric is more complicated. Circuitry must be used to slice the packet into stripes and reassemble it into packets.

Single-Cell packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could be configurable to communicate packet information at a number of interface bandwidths.

It would be advantageous if a switch fabric could communicate packet information to and from port cards at a plurality of different bandwidths.

It would be advantageous if switch fabric could communicate packet information to and from any port card in the system at a plurality of bandwidths.

SUMMARY OF THE INVENTION

The present invention describes a switch fabric with configurable bandwidth ingress and egress interfaces. That is, the fabric can communicate with a number of networks (traffic managers), regardless of the network bandwidths. The bandwidths may vary across different port cards in the fabric, or even across a single port card. Further the ingress bandwidths are independent of the egress bandwidths.

Accordingly, a method is provided for configuring interface bandwidths in a packet communications switch fabric. The method comprises: interfacing data links with a first plurality of traffic managers (TMs); differentiating port card interface ports into a first plurality of subchannels associated with the first plurality of TMs; and, communicating packets information with the TMs at a first plurality of data rates corresponding to the first plurality of subchannels.

More specifically, interfacing data links with a first plurality of TMs means that a second plurality of ingress data links are interfaced to input port card (IPC) ingress ports from a third plurality of ingress TMs (iTMs). Further, a fourth plurality of egress data links are interfaced from output port card (OPC) egress ports to a fifth plurality of egress TMs (eTMs). Then, differentiating port card interface ports into a first plurality of subchannels associated with the first plurality of TMs includes: differentiating the second plurality of ingress data links into a third plurality of ingress subchannels associated with the third plurality of iTMs; and, differentiating the fourth plurality of egress data links into a fifth plurality of egress subchannels associated with the fifth plurality of eTMs.

The other aspects, communicating packets information with the TMs at a first plurality of data rates corresponding to the first plurality of subchannels includes: the IPC receiving packet information from the iTMs at a third plurality of data rates; and, the OPC transmitting packet information to the eTMs at a fifth plurality of data rates.

Additional details of the above-described method and a packet communications switch fabric system for configuring interface bandwidths are provided below.

BRIEF DESCRIPTION OF THE DRAWINGS

FIG. 5 is a schematic block diagram of a general switch fabric system (prior art).

DETAILED DESCRIPTION OF THE PREFERRED EMBODIMENTS

Figure 1:
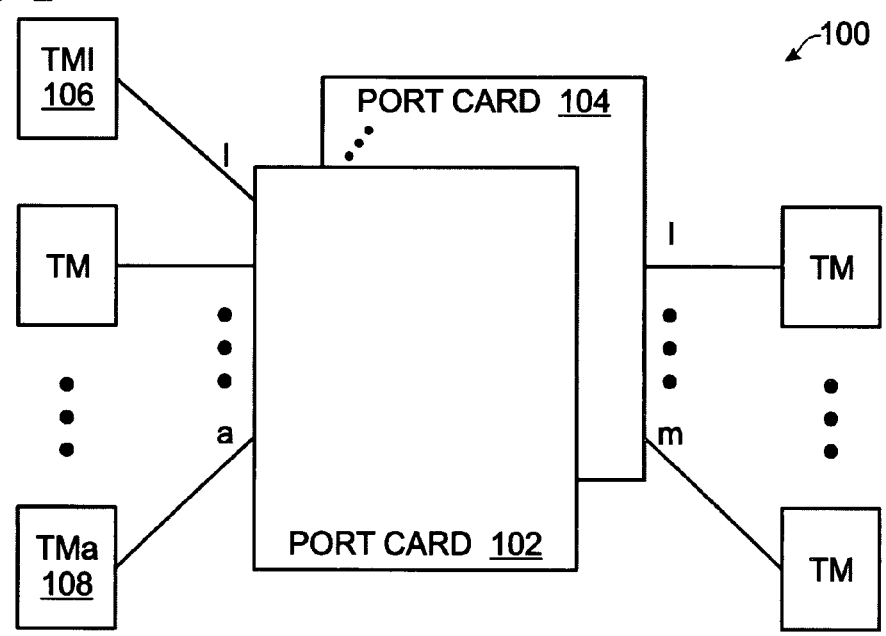
FIG. 1 is a schematic block diagram of the present invention packet communications switch fabric system for configuring interface bandwidths.

FIG. 1 is a schematic block diagram of the present invention packet communications switch fabric system for configuring interface bandwidths. The system 100 comprises a switch fabric port card 102, including data link interface ports differentiated into a first plurality of subchannels 1 through a. The subchannels communicate packet information at a first plurality of data rates corresponding to the first plurality of subchannels. The value of a is not limited to any particular value. Typically, the system 100 includes a plurality of port cards. To illustrate the invention, a first port card 102 may have interface ports differentiated into a first plurality of subchannels 1 through a, as discussed above. A second port card 104 may have interface ports differentiated into a second plurality of subchannels 1 through m, different than the first plurality. That is, the value of a need not equal the value of m.

In another aspect of the invention, independent of the consideration of bandwidth, the first port card 102 may differentiate interface ports into a first subchannel (1) for serial format packet communication and a second subchannel (a) for striped format packet communication.

From the perspective of a broader packet communications system, the system 100 may further comprise a plurality of traffic managers (TMs) 1 (106) through a (108) with interface ports for communicating packet information on data links. Then, a switch fabric port card, such as the first port card 102, has ports for interface data links with the TMs. The interface ports are differentiated into a plurality of subchannels 1 through a, associated with the plurality of TMs 1 through a. The first port card 102 communicates packets information at a plurality of data rates (a) corresponding to the plurality of subchannels 1 through a.

Figure 2:
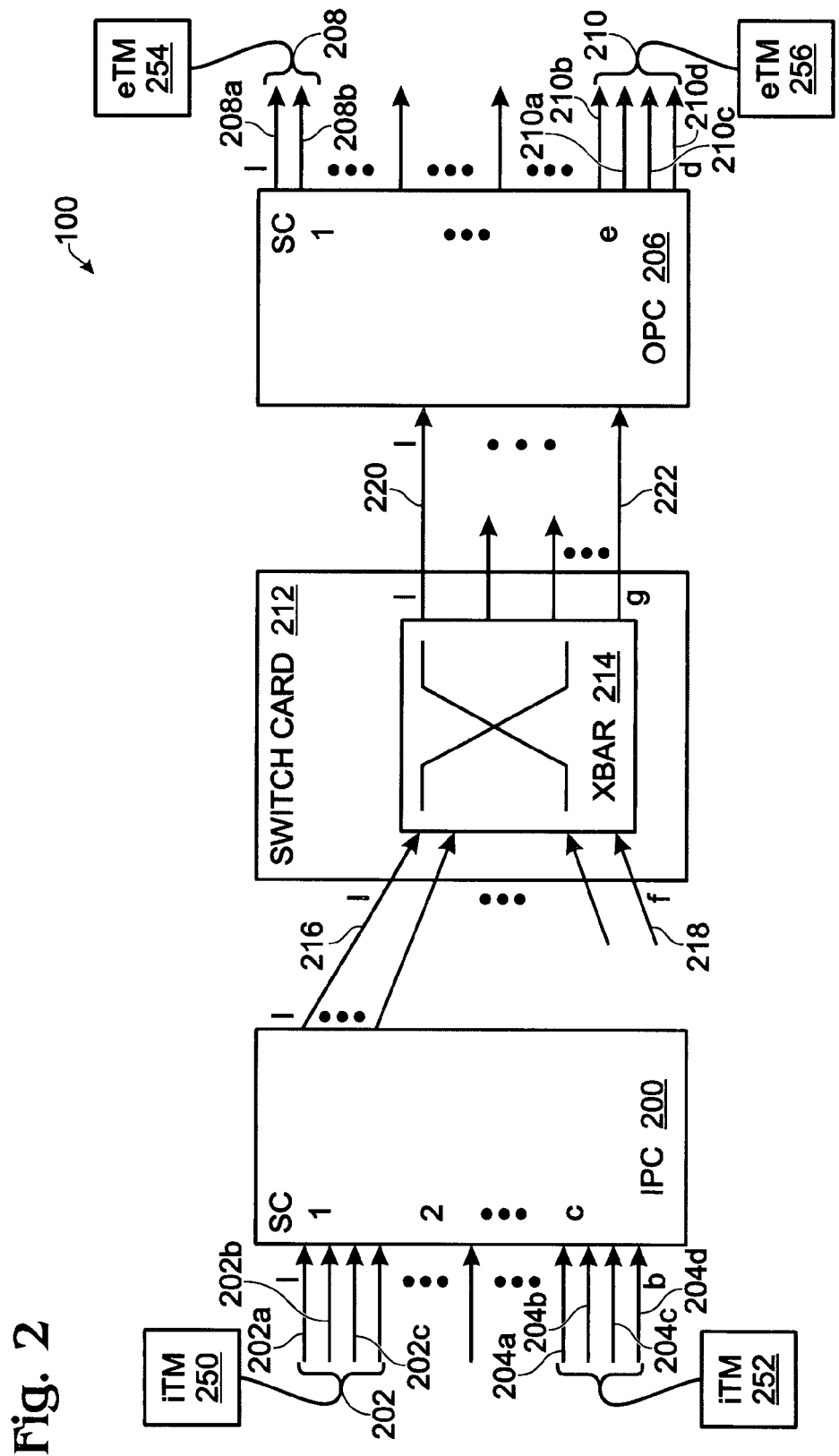
FIG. 2 is a more detailed depiction of the switch fabric of FIG. 1.

FIG. 2 is a more detailed depiction of the switch fabric of FIG. 1. Typically, the system 100 includes a plurality of input port cards. For simplicity, just a single input and a single output port card are shown. As shown, an input port card 200 (IPC) has a second plurality of ingress data link ingress ports 1 through b, on lines 202 through 204, differentiated into a third plurality of subchannels (SCs) 1 through c, where the values of b and c are not limited to any particular value.

Likewise, an output port card 206 (OPC) has a fourth plurality of egress data link egress ports 1 through d, on lines 208 through 210, differentiated into a fifth plurality of subchannels 1 through e, where d and e are not limited to any particular values. Note that it would be typical for each port card to consist of an IPC section and an OPC section.

The IPC 200 communicates packet information at a third plurality of data rates corresponding to the third plurality of subchannels 1 through c. The OPC 206 communicates packet information at a fifth plurality of data rates corresponding to the fifth plurality of subchannels 1 through e. Note, there is no predetermined relationship between the values of c and e.

The system 100 typically includes a plurality of switch cards, where a single switch card may include a plurality of crossbars. For simplicity a single switch card, with a single crossbar, is shown. As shown, a switch card 212 includes a crossbar 214. The crossbar 214 has inputs 1 through f, on lines 216 through 218, selectively connectable to crossbar outputs 1 through g, on lines 220 through 222, for transferring packets between the IPC 200 and the OPC 206. The IPC 200 has ingress backplane data links connected to the crossbar inputs 1 through f. Likewise, the OPC 206 has egress backplane data links connected to the crossbar outpus 1 through g. Note that it would be typical for both the IPC 200 and the OPC 206 to have backplane data links to a plurality of crossbars (not shown). Also note that it would be typical for the crossbar 214 to be connected to a plurality of IPCs and OPCs (not shown).

The switch card crossbar 214 transfers packet information between IPCs and OPCs through backplane data links at bandwidths independent of the ingress and egress bandwidths. That is, the backplane data link bandwidths are independent of the third plurality of data rates (1 through c) at which the IPC 200 is receiving packet information, and independent of the fifth plurality of data rates (1 through e) at which the OPC 206 is transmitting packet information.

Alternately stated, the switch card crossbar 214 transfers packet information between IPCs and OPCs through backplane data links in backplane channels independent of the third plurality of IPC 200 ingress subchannels and the fifth plurality of OPC 206 egress subchannels. The switch fabric makes a best effort to communicate packets through the backplane.

The system considers the destination egress subchannel in making the best effort as follows: The input priority queue (iPQ) scheduler in each IPC considers class of service (COS) in prioritizing the transmitting of packets from the iMS to a crossbar to a given egress subchannel. The OPC also considers COS in prioritizing transmit of packets from the eMS to the eTMs. The OPC uses an output priority queue (oPQ), or an earliest deadline first queue (EDFQ) as the egress scheduler. Either scheduler considers COS in prioritizing packet transmission. The EDFQ also considers the N-bit "packet flow ID" in the packet cell header. The iTM would assign flow IDs on packets such that higher priority packets and higher priority output subchannels get more bandwidth than lower priority subchannels. The switch cards themselves do not consider the subchannels on which the packets are being received or transmitted.

Therefore, the OPC 206 accepts packet information on egress backplane data links connected to the crossbar outputs on lines 220 through 222, and differentiates the packet information into the fifth plurality of egress subchannels (1 through e).

For example, in some aspects of the system 100, the IPC 200 differentiates a first ingress subchannel (a) with a first number of links (202a, 202b, and 202c, for example) from a second ingress subchannel (b) with a second number of links (204a, 204b, 204c, and 204d), greater than the first number. The IPC 200 accepts packet information on the first ingress subchannel at a first data rate and accepts packet information on the second ingress subchannel at a second data rate, greater than the first data rate.

Likewise, the OPC 206 may differentiate a third egress subchannel (1) with a third number of links (208a and 208b) from a fourth egress succhannel (e) with a fourth number of links (210a, 210b, 210c, and 210d), greater than the third number. The OPC 206 transmits packet information on the fourth egress subchannel at a fourth data rate and transmits packet information on the fifth egress subchannel at a fifth data rate, greater than the fourth data rate.

Further, the IPC first ingress subchannel (1) is connected to a first ingress traffic manager 250 (iTM) and the second ingress subchannel (b) is connected to a second iTM 252. The IPC 200 receives control traffic from the first iTM 250 on any of the first number of links (202a, 202b, or 202c). The IPC 200 receives control traffic from the second iTM 252 on any of the second number of links (204a, 204b, 204c, or 204d).

Likewise, the OPC 206 third egress subchannel (1) is connected to a first egress traffic manager (eTM) 254 on the third number of links (208a and 208b) and the fourth egress subchannel (e) is connected to a second eTM 256. The OPC 206 transmits control traffic to the first eTM 254 on any of the third number of links (208a or 208b) and transmits control traffic to the second eTM 256 on any of the fourth number of links (210a, 210b, 210c, or 210d).

Functional Description

Figure 3:
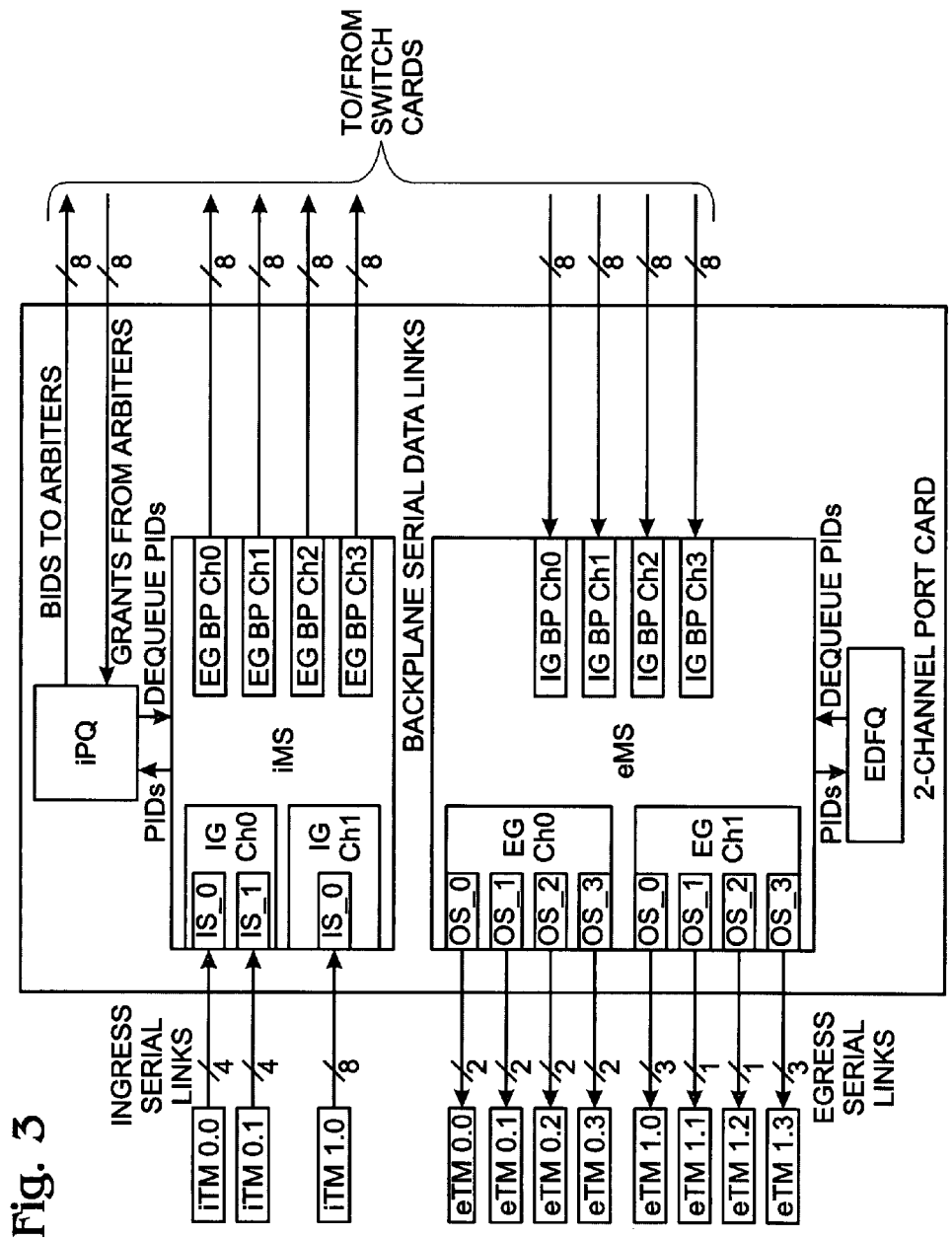
FIG. 3 illustrates an example of WAN-to-MAN switching.

FIG. 3 illustrates an example of WAN-to-MAN switching. This example shows how the invention might be used for a port card WAN-to-MAN switch fabric. Input "pipes" into the fabric are from a Wide Area Network (WAN). A typical WAN might extend across a country or even internationally. The connections are high speed "fat pipes." A Metropolitan Area Network (MAN) is a public network that covers a metropolitan area or perhaps several metropolitan areas. The connections are typically not as fast as those of the WAN.

In the example, there are two input channels. Input channel 1 has two subchannels, each with four links. Each subchannel can handle 5 Gbps of revenue traffic. Input channel 2 has only one subchannel, comprising 8 links, capable of accepting 10 Gbps of revenue traffic. The output channels, to the egress traffic managers, are tailored to the bandwidth needs of the different destinations. Egress channel 0 has four subchannels, each with two links, each capable of 2.5 Gbps of revenue traffic. Egress channel 1 is divided up into three, one, one, and three links each for subchannels 9, 1, 2, and 3, respectively. These subchannels can handle 3.75, 1.25, 1.25, and 3.75 Gbps of revenue traffic each respectively.

Each port card in a switch fabric can have a different allocation. Other port cards in the fabric might be configured to perform the opposite function—that is aggregate small pipes from the MAN into fatter pipes for the WAN.

Figure 4:
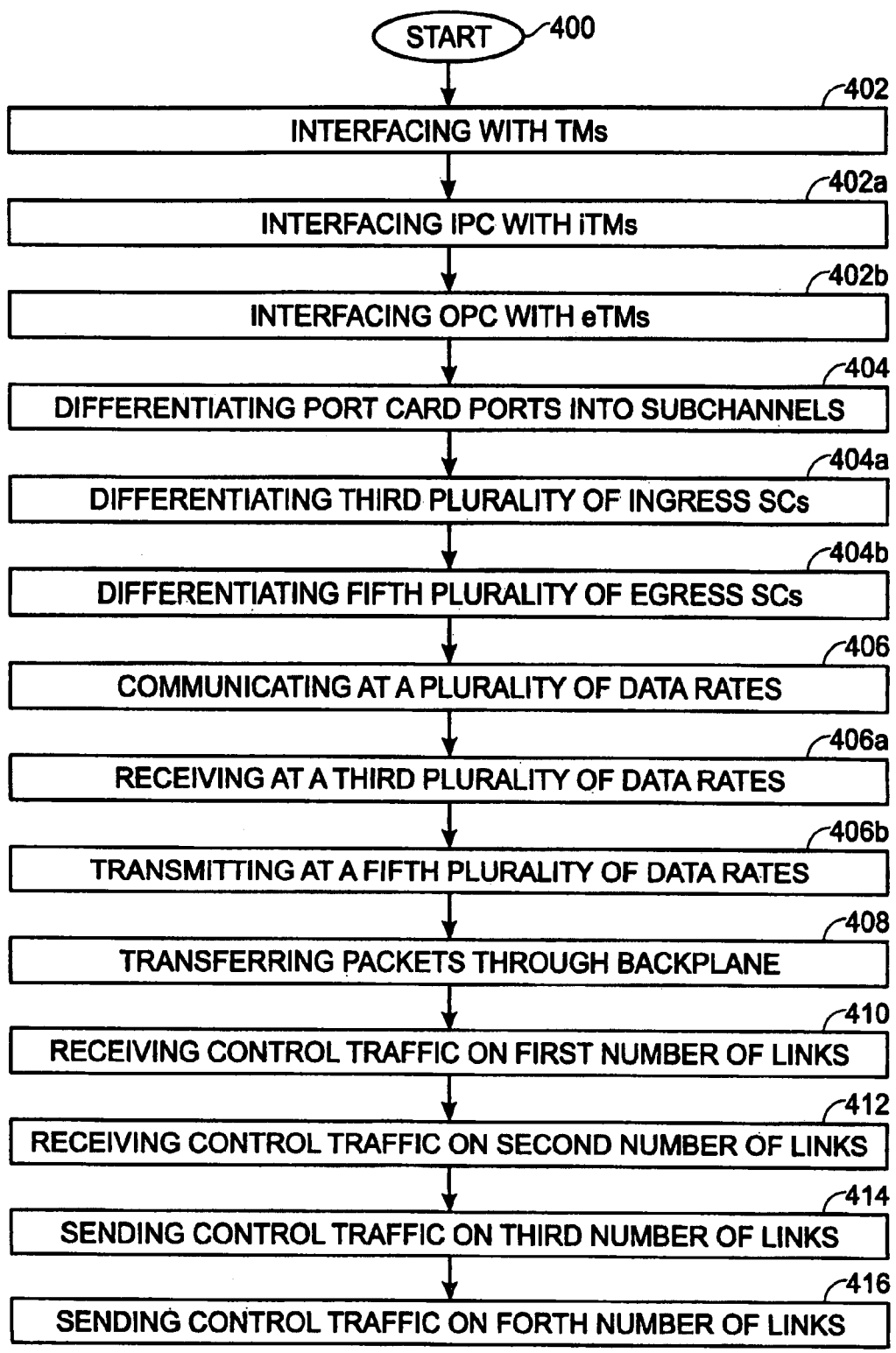
FIG. 4 is a flowchart illustrating the present invention method for configuring interface bandwidths in a packet communications switch fabric.

FIG. 4 is a flowchart illustrating the present invention method for configuring interface bandwidths in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 interfaces data links with a first plurality of traffic managers (TMs). Step 404 differentiates port card interface ports into a first plurality of subchannels associated with the first plurality of TMs. Step 406 communicates packets information with the TMs at a first plurality of data rates corresponding to the first plurality of subchannels.

In some aspects, interfacing data links with a first plurality of TMs in Step 402 includes substeps. Step 402a interfaces a second plurality of ingress data links to input port card (IPC) ingress ports from a third plurality of ingress TMs (iTMs). Step 402b interfaces a fourth plurality of egress data links from output port card (OPC) egress ports to a fifth plurality of egress TMs (eTMs). Then, differentiating port card interface ports into a first plurality of subchannels associated with the first plurality of TMs in Step 404 includes substeps. Step 404a differentiates the second plurality of ingress data links into a third plurality of ingress subchannels (SCs) associated with the third plurality of iTMs. Step 404b differentiates the fourth plurality of egress data links into a fifth plurality of egress subchannels associated with the fifth plurality of eTMs.

Further, communicating packets information with the TMs at a first plurality of data rates corresponding to the first plurality of subchannels in Step 406 includes substeps. In Step 406a the IPC receives packet information from the iTMs at a third plurality of data rates. In Step 406b the OPC transmits packet information to the eTMs at a fifth plurality of data rates.

Some aspects of the method include a further step. Step 408 transfers packet information between IPCs and OPCs through backplane data links. In some aspects, Step 408 includes communicating packet information at bandwidths independent of the third plurality of data rates at which the IPC is receiving packet information from the iTMs; and, the fifth plurality of data rates at which the OPC is transmitting packet information to the eTMs.

In other aspects, transferring packet information between IPCs and OPCs through backplane data links in Step 408 includes communicating packet information in backplane channels independent of: the third plurality of IPC subchannels associated with the third plurality of iTMs; and, the fifth plurality of OPC subchannels associated with the fifth plurality of eTMs.

In some aspects, differentiating the fourth plurality of egress data links into a fifth plurality of egress subchannels associated with the fifth plurality of eTMs in Step 404b includes substeps (not shown). Step 404b1 accepts packet information from backplane data links connected to crossbar outputs. Step 404b2 organizes the packet information into the fifth plurality of egress subchannels.

In some aspects, differentiating the second plurality of ingress data links into a third plurality of subchannels associated with the third plurality of iTMs (Step 404a) includes differentiating a first ingress subchannel with a first number of links from a second ingress subchannel with a second number of links, greater than the first number. Then, the IPC receiving packet information from the iTMs at a third plurality of data rates in Step 406a includes accepting packet information on the first ingress subchannel at a first data rate and accepting packet information on the second ingress subchannel at a second data rate, greater than the first data rate.

In other aspects, differentiating a first ingress subchannel with a first number of links from a second ingress subchannel with a second number of links (Step 404a) includes associating the first ingress subchannel with a first iTM and the second ingress subchannel with a second iTM. Then, the method comprises further steps. Step 410 receives control traffic from the first iTM at the IPC on any of the first number of links. Step 412 receives control traffic from the second iTM at the IPC on any of the second number of links.

In other aspects, differentiating the fourth plurality of egress data links into a fifth plurality of subchannels associated with the fifth plurality of eTMs in Step 404b includes differentiating a third egress subchannel with a third number of links from a fourth egress channel with a fourth number of links, greater than the third number. Then, the OPC transmitting packet information to the eTMs at a fifth plurality of data rates in Step 406b includes transmitting packet information on the fourth egress subchannel at a fourth data rate and transmitting packet information on the fifth egress subchannel at a fifth data rate, greater than the fourth data rate.

In some aspects, differentiating a third egress subchannel with a third number of links from a fourth egress subchannel with a fourth number of links in Step 404b includes associating the third egress subchannel with a first eTM and the fourth egress subchannel with a second eTM. Then, Step 414 sends control traffic from the OPC to the first eTM on any of the third number of links. Step 416 sends control traffic from the OPC to the second eTM on any of the fourth number of links.

In other aspects, differentiating a first plurality of port card interface ports into subchannels associated with the first plurality of TMs in Step 404 includes additional substeps (not shown). Step 404c differentiates interface ports into a sixth plurality of subchannels on a first port card. Step 404d differentiates interface ports into a seventh plurality of subchannels, different than the sixth plurality, on a second port card.

In other aspects, differentiating a first plurality of port card interface ports into subchannels associated with the first plurality of TMs in Step 404 includes differentiating interface ports into a first subchannel for serial format packet communication and a second subchannel for striped format packet communication.

A system and method have been provided for configuring a switch fabric interface bandwidths. A few simple examples have been given to illustrate the invention. However, the invention is not limited to merely these examples. Other variations and embodiments of the invention will occur to those skilled in the art.

We claim:

1. In a packet communications switch fabric, a method for configuring network interface bandwidths, the method comprising:
   interfacing port card network-side interface ports with a network
   differentiating the port card network-side interface ports by subchannel groups each subchannel group including at least one subchannel;
   assigning links to each subchannel; and,
   communicating packet information via each subchannel group at a data rate responsive to the number of links in the subchannel group.

2. The method of claim 1 wherein interfacing the port card network-side interface ports includes:
   interfacing input port card (IPC) network-side ingress ports to network-connected sources; and,
   interfacing output port card (OPC) network-side egress ports to network-connected destinations.

3. The method of claim 2 wherein differentiating port card network-side interface ports into subchannel groups includes:
   differentiating IPC ingress subchannel groups; and,
   differentiating OPC egress subchannel groups.

4. The method of claim 3 wherein communicating packet information via each subchannel groups at a data rate responsive to the number of links in the subchannel group includes:
   each IPC ingress subchannel group receiving packet information at a data rate responsive to the number of links in the IPC ingress subchannel group; and,
   each OPC egress subchannel group transmitting packet information at a data rate responsive to the number of links in the OPC egress subchannel group.

5. The method of claim 4 further comprising:
   transferring packet information between IPCs and OPCs through backplane data links.

6. The method of claim 5 wherein transferring packet information between IPCs and OPCs through backplane data links includes communicating packet information at bandwidths independent of:
   the data rates at which the IPC ingress subchannel groups are receiving packet information; and,
   the data rates at which the OPC egress subchannel groups are transmitting packet information.

7. The method of claim 5 wherein transferring packet information between IPCs and OPCs through backplane data links includes communicating packet information in backplane channels independent of the number of links in the TPC ingress subchannel groups and the number of links in the OPC egress subchannel groups.

8. The method of claim 5 wherein transferring packet information between IPCs and OPCs through backplane data links include connecting backplane data links via crossbars.

9. The method of claim 8 wherein differentiating IPC ingress subchannel groups includes differentiating a first ingress subchannel group with a first number of links from a second ingress subchannel group with a second number of links, greater than the first number; and,
   wherein the IPC ingress subchannel groups receiving packet information includes accepting packet information on the first ingress subchannel group at a first data rate and accepting packet information on the second ingress subchannel group at a second data rate, greater than the first data rate.

10. The method of claim 9 wherein interfacing IPC network-side ingress ports to network-connected sources includes interfacing the IPC first ingress subchannel group to a first network-connected source, and interfacing the IPC second ingress subchannel group to a second network-connected source
    the method further comprising:
    receiving control traffic from the first network-connected source on any of the first number of links; and,
    receiving control traffic from the second network-connected source on any of the second number of links.

11. The method of claim 8 wherein differentiating the OPC egress subchannel groups includes differentiating a third egress subchannel group with a third number of links from a fourth egress subchannel group with a fourth number of links, greater than the third number; and,
    wherein the OPC egress subchannels groups transmitting packet information includes transmitting packet information on the third egress subchannel group at a third data rate and transmitting packet information on the fourth egress subchannel group at a fourth data rate, greater than the third data rate.

12. The method of claim 11 wherein interfacing OPC network-side egress ports to network-connected destinations includes interfacing the OPC third egress subchannel group to a first network-connected destination, and interfacing the OPC fourth egress subchannel group to a second network-connected destination
    the method further comprising:
    sending control traffic to the first network-connected destination on any of the third number of links; and,
    sending control traffic to the second network-connected destination on any of the fourth number of links.

13. The method of claim 1 wherein differentiating the port card network-side interface ports by subchannel groups includes differentiating a subchannel group for serial format packet communication and a subchannel group for striped format packet communication.

14. A packet communications switch fabric system for configuring network interface bandwidths, the system comprising:
    a switch fabric port card with an interface to a crossbar and including network-side interface ports differentiated into subchannel groups, each subchannel group including at least one subchannel and each subchannel including assigned links, for communicating packet information at data rates responsive to the number of links in each subchannel group.

15. The system of claim 14 wherein the switch fabric port card includes:
    an input port card (IPC) having network-side ingress ports network-connected to sources; and,
    an output port card (OPC) having network-side egress ports network-connected to destinations.

16. The system of claim 15 wherein the IPC receives packet information via IPC ingress subchannel groups; and,
    wherein the OPC transmits packet information via OPC egress subchannel groups.

17. The system of claim 16 further comprising:
    a switch card crossbar having crossbar inputs selectively connectable to crossbar outputs for transferring packet information between the IPC and the OPC;
    wherein the IPC has ingress backplane data links connected to the crossbar inputs; and,
    wherein the OPC has egress backplane data links connected to the crossbar outputs.

18. The system of claim 17 wherein the switch card crossbar transfers packet information between IPCs and OPCs through backplane data links at bandwidths independent of the number of links in the IPC ingress subchannel groups and the number of links in the OPC egress subchannel groups.

19. The system of claim 17 wherein the IPC differentiates a first ingress subchannel group with a first number of links from a second ingress subchannel group with a second number of links, greater than the first number; and, wherein the IPC first ingress subchannel group accepts packet information at a first data rate and the IPC second ingress subchannel group accepts packet information at a second data rate, greater than the first data rate.

20. The system of claim 19 wherein the IPC first ingress subchannel group is network-connected to a first source and the IPC second ingress subchannel group is network-connected to a second source; and, wherein the IPC first ingress subchannel group receives control traffic from the first source on any of the first number of links and the IPC second ingress subchannel group receives control traffic from the second source on any of the second number of links.

21. The system of claim 18 where the OPC differentiates a third egress subchannel group with a third number of links from a fourth egress subchannel group with a fourth number of links, greater than the third number; and, wherein the OPC third egress subchannel group transmits packet information at a third data rate and the OPC fourth egress subchannel group transmits packet information at a fourth data rate, greater than the third data rate.

22. The system of claim 21 wherein the OPC third egress subchannel group is network-connected to a first destination with a third number of links and the OPC fourth egress subchannel group is network-connected to a second destination with a fourth number of links; and, wherein the OPC third egress subchannel group transmits control traffic to the first destination on any of the third number of links and the OPC fourth egress subchannel group transmits control traffic to the second destination on any of the fourth number of links.

23. The system of claim 14 further comprising:

a plurality of switch fabric port cards, each including an interface to a crossbar and network-side interface ports differentiated into subchannel groups, with links assigned to each subchannel.

24. The system of claim 14 wherein the port card differentiates network-side interface ports into a subchannel group for serial format packet communication and a subchannel group for striped format packet communication.

* * * * *